Dec. 11, 1956 C. A. HOLLINGSWORTH 2,773,736
TREATMENT OF PHOSPHATE ROCK TO RECOVER PHOSPHORUS,
FLUORINE, CALCIUM, AND URANIUM
Filed Aug. 8, 1952
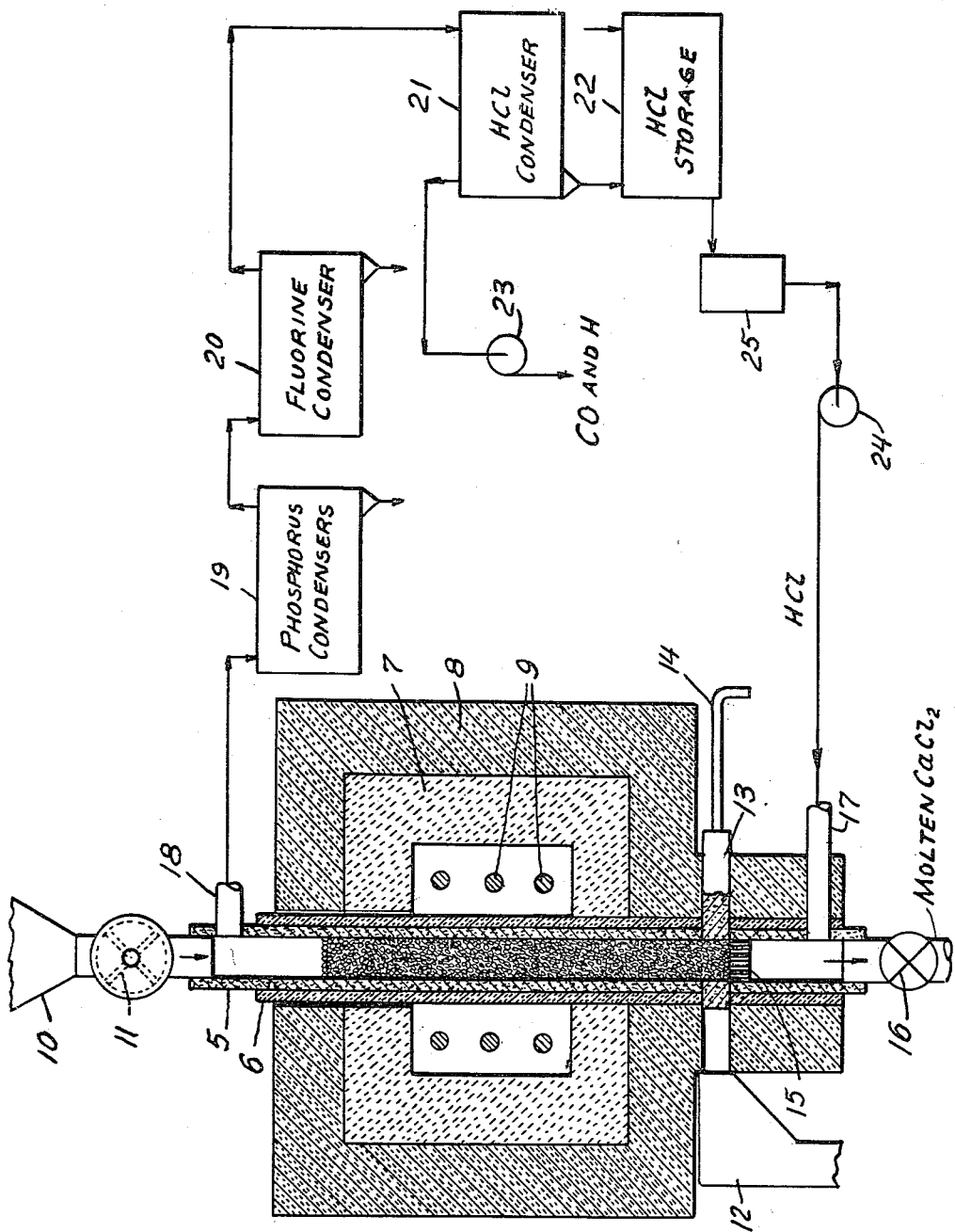
INVENTOR
CLINTON A. HOLLINGSWORTH
BY
Pennie, Edmonds, Morton, Barrows & Taylor
ATTORNEYS

United States Patent Office 2,773,736
Patented Dec. 11, 1956

2,773,736

TREATMENT OF PHOSPHATE ROCK TO RECOVER PHOSPHORUS, FLUORINE, CALCIUM, AND URANIUM

Clinton A. Hollingsworth, Lakeland, Fla., assignor to Smith-Douglass Company, Incorporated, Norfolk, Va., a corporation of Virginia Application August 8, 1952, Serial No. 303,270

5 Claims. (Cl. 23—14.5)

This invention relates to the treatment of phosphate rock and similar natural phosphatic materials, and has for its object the recovery therefrom of values by a novel and economical method.

The common phosphate rocks contain calcium, phosphorus, fluorine and oxygen in various combinations. The phosphorus is usally combined with calcium in proportions to form tricalcium phosphate ($3CaO \cdot P_2O_5$). The fluorine is commonly believed to be present as calcium fluoride ($CaF_2$) combined with the tricalcium phosphate as fluorapatite ($9CaO \cdot CaF_2 \cdot 3P_2O_5$). Additionally the raw rock contains relatively small amounts of calcium carbonate ($CaCO_3$), silica ($SiO_2$), aluminum and iron oxides ($Al_2O_3$ and $Fe_2O_3$), organic matter and minor other impurities. Some natural phosphate rocks contain aluminum oxide in substantial amount, probably combined with phosphorus in proportions to form aluminum phosphate ($Al_2O_3 \cdot P_2O_5$). Most phosphate rocks, and more especially those containing substantial amounts of aluminum phosphate, contain very small amounts of uranium.

The present invention contemplates the recovery, in marketable form, of the phosphorus, fluorine, calcium, uranium and aluminum (when present in substantial amount) contents of phosphate rocks and similar natural phosphatic materials. To this end, the invention involves heat-treating the phosphatic material in the presence of a suitable reducing agent, such as a carbonaceous material, in an atmosphere containing chlorine preferably in the form of dry hydrogen chloride (hydrochloric acid gas—HCl). The heat-treatment is carried out at a temperature between 2000 and 2400° F., or higher, in the chlorine-containing atmosphere until the fluorapatite or other phosphate constituent of the phosphatic material has been reduced and phosphorus and fluorine have been volatilized, leaving the calcium, uranium and aluminum in the residue. Fluorine volatilizes as hydrogen fluoride (hydrofluoric acid-HF), and phosphorus initially volatilizes mainly as elemental phosphorus, but under varying operating conditions may be present in the gaseous reaction product of the heat-treatment as phosphorus trichloride ($PCl_3$) and/or phosphorus pentachloride ($PCl_5$). Iron volatilizes as ferrous or ferric chloride, or both ($FeCl_2$ and/or $FeCl_3$). Calcium combines with chlorine to form calcium chloride ($CaCl_2$) which at the temperature of heat-treatment remains in the residue in a molten state. Whatever uranium is present in the phosphatic material also remains in the residue in the form of a water-soluble chloride (probably a uranyl chloride such as $UO_2Cl_2$) mainly associated with the molten calcium chloride. The residue also contains whatever silica was present in the phosphatic material as well as any aluminum (principally in the form of aluminum oxide or alumina), and since the silica and alumina are solid and not fused at the temperature of heat-treatment they may be readily separated from the molten calcium chloride and uranium content associated therewith.

In carrying out the process of the invention, the phosphate rock (or other natural phosphatic material) is usually finely divided. The preferred reducing agent is a carbonaceous material such as coal or coke, also finely divided and intimately mixed with the finely divided phosphate rock. The mixture is preferably made into nodules or briquettes to facilitate handling, although the finely divided mixture may be directly heat-treated in suitable apparatus, as for example in a fluo-solids operation. Although it is generally preferable to finely grind the phosphate rock and coal in order to secure intimate contact of the chlorine-containing gas therewith, an intimate mixture of rock and coal particles about ¼ inch in size (e. g. Florida concentrates mostly minus 20 mesh standard Tyler screen) gives satisfactory results, and in a large scale operation where the depth of the charge is relatively deep even coarser materials may be used.

The mixture of phosphatic and carbonaceous materials should contain at least 10% by weight of carbon. When the amount of carbon in the mixture is below 10%, volatilazation of phosphorus is incomplete, and for this reason it is advantageous and preferable to include from 15 to 30% by weight of carbon in the mixture of phosphatic and carbonaceous materials. Theoretically, the amount of carbon entering into and consumed in the heat-treatment reactions should depend, to some extent at least, on the grade (i. e. $P_2O_5$ content) of the phosphatic material. However, in practicing the invention, the aforementioned percentages of carbon exceed the amount theoretically required for the treatment of phosphatic materials having a $P_2O_5$ content of from 25 to 40%, and such percentages of carbon are usually applicable to any phosphatic material within those grade limits. In treating phosphatic materials of lower and higher grades, the percent of carbon mixed with the material may be correspondingly adjusted.

The intimately mixed phosphatic and carbonaceous materials are heat-treated at a temperature between 2000 and 2400° F., or higher, in an atmosphere containing chlorine. While temperatures up to 2400° F. are adequate for the purposes of the invention, higher temperatures are not harmful since the residue, for the most part, may be fused or melted, if desired. The heat-treatment is continued until substantially complete volatilization of fluorine and phosphorus has been accomplished, which at a heat-treatment temperature of 2100–2200° F. requires a detention period of from 10 to 30 minutes, and usually about 20 minutes. Dry hydrochloric acid gas is the preferred chlorine-containing atmosphere, although chlorine itself, ammonium chloride and equivalent gaseous agents containing chlorine or hydrogen chloride in available form may be used to provide the necessary chlorine-containing atmosphere. When using chlorine gas, it is advisable that some hydrogen chloride or ammonium chloride be used in conjunction therewith. The amount of chlorine theoretically required to effect the contemplated chemical reactions depends mainly upon the lime (CaO) content of the phosphatic material, since all of the calcium of the phosphatic material is to be converted to calcium chloride. However, such theoretical amount of chlorine is inadequate for the purposes of the invention, and in practicing the invention with charge mixtures made up of the common phosphate rocks (having a $P_2O_5$ content of 25–40%) and 10 to 30% by weight of coal, an amount of chlorine at least equivalent to from 50 to 150 parts by weight for each 100 parts by weight of the charge mixture should be present in the chlorine-containing atmosphere. In practice an excess of chlorine is desirable to insure intimate and constant contact of the charge with chlorine during the entire period of heat-treatment and until fluorine and phosphorus have been volatilized to the desired extent. Any excess of chlorine may be recovered from the gaseous product of the heat-treatment and re-cycled.

Heat-treatment is carried out in any suitable type of externally-heated retort or muffle equipped for the introduction of the chlorine-containing gas and the withdrawal of the gaseous reaction product. The retort or muffle, as well as the other parts of the equipment coming in contact with chlorine-containing gases, are preferably made of, or lined with, graphite. Most of the fluorine is evolved before substantial volatilization of phosphorus occurs, and in a batch operation this permits a rough selective condensation and separation of the evolved compounds of fluorine and phosphorus from the gaseous reaction product. The over-all reactions of the heat-treatment are exothermic, and the amount of external heating should be properly correlated to the amount of internal exothermic heating to avoid unnecessary or undue overheating of the charge.

Any suitable type of apparatus may be used in carrying out the heat-treatment such as a vertical shaft furnace, a travelling hearth furnace of either the tunnel or revolving type, a horizontal muffle furnace etc. Preferably, heat-treatment is carried out as a continuous operation, although it may be conducted as a batch operation if desired. At the temperature of heat-treatment, the conventional refractory materials are attacked by the chlorine-containing atmosphere and the hot gaseous reaction products, and hence all parts of the heating apparatus and its appurtenances coming in contact with such atmosphere and products should be of graphite, carbon or equivalent refractory material. It is important that the heating apparatus permit intimate and continuous contact of the chlorine-containing atmosphere with the entire body of charge undergoing treatment until the contemplated volatilization of fluorine and phosphorus has been accomplished. To this end, it is preferable to pass a stream of the chlorine-containing atmosphere over and through the entire body of the charge so that chlorine in the atmosphere contacting the charge is replaced as rapidly as it is consumed by reaction with the charge constituents, and in a continuous operation the relative movement of the chlorine-containing gas stream and the charge should be counter-currentwise.

The gaseous reaction product is withdrawn from the heat-treatment apparatus and conveyed to the condensing equipment. In a first condenser, most of the evolved elemental phosphorous and phosphorus chlorides are recovered, and in a succeeding condenser most of the evolved hydrogen fluoride is recovered. The exhaust gas of the fluorine condenser contains the excess of the hydrogen chloride or equivalent chlorine-containing gas employed in the heat-treatment as well as carbon monoxide (CO), hydrogen (H) and probably a minor amount of carbon dioxide ($CO_2$) formed during the heat-treatment reactions. The hydrogen-chloride in the exhaust gas may be condensed, following the fluorine condenser, and recycled, and the carbon monoxide and hydrogen may be recovered or wasted depending upon local economics.

The nature of the reactions taking place during heat-treatment is complicated by the complex character of the phosphate rock, and further depends (to some extent at least) on the composition of the chlorine-containing atmosphere and the relative amounts of rock and carbonaceous material in the mixture undergoing treatment. While I am not prepared to state what these reactions are, it is my present belief that the initial reaction is a reduction of the fluorapatite in the rock with the volatilization of elemental phosphorus and perhaps elemental fluorine. In the presence of hydrogen chloride, the calcium liberated in the reduction forms calcium chloride and any elemental flourine forms hydrogen fluoride. Depending upon the amount of chlorine present, the initially liberated elemental phosphorus may exist in the gaseous product of the reaction as such or in part or wholly as phosphorus trichloride or phosphorus pentachloride. The following equations indicate what I now believe may be the theoretical over-all result of the heat-treatment:

(1) $9CaO \cdot 3P_2O_5 \cdot CaF_2 + 20HCl + 15C \rightarrow$
$6P + 2HF + 15CO + 9H_2O + 10CaCl_2$
(2) $9CaO \cdot 3P_2O_5 \cdot CaF_2 + 20HCl + 24C \rightarrow$
$6P + 2HF + 24CO + 18H + 10CaCl_2$
(3) $9CaO \cdot 3P_2O_5 \cdot CaF_2 + 29HCl + 24C \rightarrow$
$3P + PCl_3 + 2HF + 24CO + 29H + 10CaCl_2$
(4) $9CaO \cdot 3P_2O_5 \cdot CaF_2 + 38HCl + 24C \rightarrow$
$6PCl_3 + 2HF + 24CO + 36H + 10CaCl_2$
(5) $9CaO \cdot 3P_2O_5 \cdot CaF_2 + 20NH_4Cl + 24C \rightarrow$
$6PH_3 + 2HF + 24CO + 20NH_3 + 10CaCl_2$ The theoretical charges and the theoretical amount of HCl required for the foregoing equations are as follows:

|  | (1) | (2) | (3) | (4) | (5) |
| --- | --- | --- | --- | --- | --- |
| Percent $9CaO \cdot 3P_2O_5 \cdot CaF_2$ | 84.85 | 77.78 | 77.78 | 77.78 | 77.78 |
| Percent C | 15.15 | 22.22 | 22.22 | 22.22 | 22.22 |
| Theoretical parts HCl per 100 parts charge | 61.45 | 56.33 | 81.6 | 107 | 56.5 |

While there is positive evidence of the presence of carbon monoxide and hydrogen in the gaseous reaction product, it may well be that these substances are not actually present in the theoretical amounts indicated in the foregoing equations. Moreover, with a charge mixture containing 15 to 30% of carbon, there is always some carbon left in the residue from the heat-treatment, indicating an excess of carbon over and above the amount entering into and consumed in the heat-treatment reactions.

Since economic practice of the invention requires intimate and continuous contact of the chlorine-containing gas with the entire body of the charge mixture, a loose charge of finely divided materials should be rabbled or otherwise suitably stirred or agitated to insure that all parts of the charge are exposed to the action of chlorine at the heat-treatment temperature. Preferably, the charge mixture is formed into nodules, pellets, briquettes or other agglomerates (e. g. by agglomerating, briquetting, extruding or the like). The nodules etc. should be sufficiently porous to permit unimpeded penetration of chlorine into the interior thereof and free evolution of the volatile products of the reaction from the interior thereof to the ambient atmosphere, and to this end suitable porosity agents may be included in the charge mixture before nodulizing or the like. Advantageously, a bituminous coking coal may be mixed with the phosphatic material, to supply the required carbon, and, after nodulizing or the like, the nodules or the like may be subjected to a low-temperature coking treatment in the course of which the volatile constituents of the coal are driven off and porous coked nodules or the like are produced of adequate strength to withstand subsequent handling.

The non-volatile residue of the heat-treatment consists of the molten calcium chloride and non-molten (i. e. unfused) solid silica, alumina, residual carbon and minor amounts of other non-volatile substances present in the charge mixture of phosphatic and carbonaceous materials. Substantially all of the uranium present in the original phosphatic material is associated with the molten calcium chloride in the form of a water soluble compound now believed to be a chloride or oxi-chloride. At and well below the temperature of heat-treatment, the molten and solid portions of the residue can be readily separated. In the preferred practice of the invention, with a nodulized charge mixture initially containing a bituminous coking coal as the source of carbon, the residue will be largely in the form of honey-combed aggregates with molten calcium chloride in the interstices thereof. From such a residue, the molten portion is easily separated from the unfused solid portion by a simple draining operation, by decantation, by filtration, or the like.

Chlorine for the practice of the invention is advantageously produced electrolytically, and may be reacted with electrolytically-produced hydrogen to form hydrochloric acid gas. The hydrochloric acid gas should be dry when introduced into the heat-treating apparatus, and may, if desired, be preheated to minimize any deleterious chilling effect upon the charge mixture. The charge mixture itself should be free of moisture, and to this end may be preheated prior to entering or introduction into the chlorine-containing atmosphere of heat-treatment. In this connection, mention should be made of the fact that most raw phosphate rocks usually contain considerable moisture, calcium and perhaps other carbonates and organic matter, and such rocks are preferably calcined to drive off the moisture and the carbon dioxide of the carbonates and to carbonize the organic matter. Throughout this specification and the appended claims it is to be understood that the phosphate rock or other phosphatic material entering into the charge mixture is substantially free of moisture, and all amounts of such materials herein recited are on a dry basis. Similarly, the carbonaceous material entering into the charge mixture is substantially free of moisture, and all amounts thereof herein recited are on a dry basis.

Silica in the charge mixture should be as low as practicable, since excessive silica has a deleterious influence on the chloridizing of both calcium and uranium. Preferably, the silica content of the charge mixture does not exceed 6%, by weight. By modern methods of concentration, phosphate plant products containing 3-3.5% silica (usually determined and designated as insoluble matter in the phosphate industry) are obtained, and such products may be advantageously used in the practice of the invention. For the same reasons, carbonaceous materials of low silica content should be selected for admixture with the phosphatic material.

The single figure of the accompanying drawing is a sectional elevation of an apparatus, with appurtenances diagrammatically shown, for practicing the invention.

The heat-treating apparatus illustrated in the drawing comprises a cylindrical vertical retort 5 made of graphite and surrounded by a layer 6 of silicon carbide. The retort is mounted in a built-up furnace structure having an inner heat-refractory portion 7, such as high temperature brick, and an outer portion 8 of insulating brick or the like. The furnace is electrically heated by resistance elements 9. The charge mixture of phosphatic material and carbon, preferably agglomerated, is fed into the top of the retort from a feed hopper 10 through a star-wheel feeding device 11. Solid residues are removed from near the bottom of the retort 5 into a discharge chute 12 by a reciprocating solids-discharge device 13 having a manipulating rod 14 which may be manually or automatically operated.

A perforated graphite disc 15 is mounted within the lower part of the restort 5, immediately below the solids-discharge device 13, to permit molten calcium chloride and associated uranium chloride to drain from the residual charge, and thence discharged from the apparatus through a star-wheel discharge device 16 into a sealed tank (not shown).

Hydrogen chloride, or other suitable chlorine-containing gas, is introduced through a pipe 17 into the lower part of the retort 5, between the perforated disc 15 and discharge device 16. The gaseous reaction product of the heat-treatment is withdrawn from the top part of the retort 5 through an outlet pipe 18, and first passes through one or more phosphorus condensers 19 and then through a fluorine condenser 20. The exhaust gas of the fluorine condenser is passed to a condenser 21 in which hydrogen chloride is condensed and thence delivered to a storage receptacle 22 for hydrogen chloride. The gaseous exhaust of the condenser 21, which contains the carbon monoxide and hydrogen formed during the heat-treatment, may be recovered in any suitable way or may be wasted. A pump 23 serves to draw the gaseous reaction product from the retort 5 and to force the gas stream through the condensers 19, 20 and 21. Fresh hydrogen chloride is added as required to the storage receptacle 22. A pump 24 withdraws hydrogen chloride through a vaporizer 25 and delivers the resulting hydrogen chloride gas to the pipe 17.

The following example illustrates a practice of the invention, in which the charge mixture consisted of 70% ground phosphate rock and 30% bituminous coal. The charge mixture was made into nodules about ½ inch in size, and dried. The dried nodules were initially heat-treated at a temperature of 2000-2200° F. in an atmosphere of nitrogen for about 5 minutes to remove the volatile constituents of the coal. Heat-treatment of the thus partially coked nodules was then carried out at a temperature of 2000-2000° F. for 90 minutes, in a batch-type operation, using hydrogen chloride in excess for the chlorine-containing atmosphere:

*Analysis of rock and charge (calculated)*

|  | $P_2O_5$ | Insol. | $Fe_2O_3$ | $Al_2O_3$ | CaO | F | U | Coal |
|---|---|---|---|---|---|---|---|---|
| Rock_____percent__ | 35.81 | 2.83 | 0.60 | 1.08 | 49.48 | 3.92 | 0.012 | _____ |
| Charge_____do____ | 25.07 | 1.98 | 0.42 | 0.77 | 34.64 | 2.74 | 0.0084 | 30 |

Approximately 85% of the phosphorus was volatilized. Approximately 90% of the fluorine was volatilized as hydrogen fluoride. Substantially all of the calcium in the original rock was present in the residue, mostly as molten calcium chloride containing about 0.01% uranium. The solid portion of the residue consisted principally of the insoluble constituents of the rock (mainly silica), unvolatilized phosphorus and fluorine compounds and residual carbon. About 75% by weight of the total residue was water-soluble, and consisted mainly of calcium chloride. The uranium was in this water-soluble part of the residue. About 45% of the water-insoluble part of the residue consisted of carbon. Substantially all of the unvolatilized phosphorus and fluorine and some calcium was present in the water-insoluble part of the residue.

The gaseous reaction product leaving the hot zone of the heat-treatment apparatus has a temperature of about 2000° F. For effective condensation of the volatilized phosphorus, the phosphorus condensers may have an over-all operating temperature range of from about 68 to about 536° F. The initial gaseous reaction product should therefore be substantially cooled before entering the phosphorus condenser. Since the volume of the gaseous product is not large, its cooling presents no special problem, and cooling may be effected with air or water applied to the exhaust flue 18, at any point between the retort 5 and the first phosphorus condenser. Such cooling may be advantageously effected in large part by utilizing the heat of the gaseous products to preheat the nodulized charge mixture in the unheated upper part of the retort 5 before the charge enters the heated hot zone of the retort.

In practice, the temperature of the gaseous reaction product as it leaves the retort 5, through the outlet pipe 18, may thus be maintained at 600–800° F. While it is believed that the phosphorus is present in the initial hot gaseous product mainly in the form of elemental phosphorus, some, or even all, of such elemental phosphorus may, in the presence of chlorine, be converted to phosphorus chlorides. Elemental phosphorus condenses at about 536° F., phosphorus pentachloride condenses at about 320° F., and phosphorus trichloride condenses at about 167° F. By using more than one condenser, the elemental phosphorus can be condensed separately from the phosphorus chlorides. For example, elemental phosphorus may be recovered in a first condenser operating at 320–536° F., phosphorus pentachloride may be recovered in a second condenser operating at 167–320° F., and phosphorus trichloride may be recovered in a third condenser operating at 68–167° F. Irrespective of its precise chemical composition, 85–98% of the phosphorus content of the phosphatic material of the charge is recovered in the liquid condensates withdrawn from the phosphorus condensers. The liquid condensates may be directly marketed as a raw source of phosphorus, or subjected to any appropriate subsequent treatment for producing other marketable phosphorus compounds.

Hydrogen fluoride condenses at about 68° F., and hence the operating temperature of the fluorine condenser is maintained not higher than, and preferably somewhat lower than, 68° F. Alternatively to condensing hydrogen fluoride, the gas may be absorbed on sodium fluoride. In either case, a concentrated fluorine product is obtained, which is directly marketable as a raw source of fluorine. The exhaust gas of the fluorine condenser 20 is passed to the condenser 21 where the excess hydrogen chloride gas is condensed, and the condensate conveyed to the receptacle 22. The exhaust gas of the condenser 21 is the residual gas from the heat-treatment and contains carbon monoxide, hydrogen, and possible some carbon dioxide. Depending on local economic conditions, the carbon monoxide and hydrogen may be recovered from this residual gas for subsequent use, or the entire residual gas may be wasted.

The molten residue discharged from the retort 5 consists mainly of calcium chloride containing around 0.01% of a water soluble uranium compound, probably an oxichloride (e. g. $UO_2Cl_2$). The uranium can be separated from the calcium chloride by methods of chemical precipitation or by ion exchange reaction, as for example by precipitation as an inorganic salt by ion exchange reaction with an organic resin, by extraction with an organic solvent, by reduction to a carbide as a furnace product, or by a combination of such methods. The molten residue is a marketable product on account of both its calcium chloride and uranium contents. Should the solid residue contain any substantial amount of phosphorus, there is a possibility that uranium will combine with and be tied up in such residual phosphorus, from which separation of the uranium is extremely difficult. Hence, in practice, volatilization of phosphorus is as nearly complete as practicable to minimize the amount of residual phosphorus in the solid residue. Where the phosphatic material of the inital charge mixture contains aluminum phosphate, the solid residue will contain aluminum oxide, in amount sufficient to warrant subsequent treatment of the residue as a raw source of alumina.

As hereinbefore stated, the initial reaction of the heat-treatment is believed to be a chemical reduction of fluorapatite by the carbonaceous reducing agent admixed with the phosphatic material. The reduced phosphorus and fluorine are volatilized, and the reduced calcium combines with chlorine in the chlorine-containing atmosphere to form calcium chloride which is molten at the temperature of heat-treatment. Form a practical standpoint, a solid reducing agent, such as carbon mixed with the phosphatic material, is no believed best adapted for effecting the initial reduction of the fluorapatite. But gaseous reducing agents, such as hydrogen, carbon monoxide and hydrocarbons, may replace cold carbon in whole or in part. In addition to supplying the necessary chlorine for chloridizing the reduced calcium, the chlorine-containing atmosphere so promotes the heat treatment reaction that reduction of the fluorapatite is effected at substantially lower temperatures than otherwise possible, whereby the non-volatile residue of the heat treatment, other than the molten calcium chloride, remains unfused and solid. Furthermore, by providing a large excess of chlorine (e. g. 150 parts or more per 100 parts of charge mixture) elemental phosphorus is converted to a chloride of phosphorus, which can be condensed and handled with somewhat less care and precautions than elemental phosphorus.

I claim:

1. The method of recovering values from a natural phosphatic material containing recoverable amounts of phosphorus, fluorine and calcium which comprises preparing an intimate mixture consisting essentially of said material and at least 10% by weight of a carbonaceous material, subjecting said mixture to heat-treatment for a period not exceeding 90 minutes at a temperature within the range of 2000 to about 2400° F. in a chlorine-containing atmosphere selected from the class consisting of hydrogen chloride and ammonium chloride, in which chlorine is present in excess of the amount theoretically required to convert all of the calcium in the phosphatic material to calcium chloride, and subjecting the gaseous reaction product of the heat-treatment to selective condensation in which at least two condensates are obtained respectively consisting for the most part of the phosphorus and fluorine contents of said gaseous reaction product, the non-volatile residue of said heat-treatment containing most of the calcium originally present in the phosphatic material in the form of molten calcium chloride.

2. The method of claim 1 in which the molten calcium chloride is separated from the unfused solid matter of the non-volatile residue of the heat-treatment.

3. The method of claim 2 in which the natural phosphatic material additionally contains a recoverable amount of uranium, and recovering such uranium with the calcium chloride separated from the non-volatile residue of the heat-treatment.

4. The method of recovering values from a natural phosphatic material containing recoverable amounts of phosphorus, fluorine and calcium which comprises preparing an intimate mixture consisting essentially of said material and from 15 to 30% by weight of a carbonaceous material, subjecting said mixture to heat-treatment for a period not exceeding 90 minutes at a temperature within the range of 2000 to about 2400° F. in an atmosphere of ammonium chloride in which the amount by weight of chlorine present is at least the equivalent of from 50 to 150 parts per 100 parts of said mixture, subjecting the gaseous reaction product of the heat-treatment to selective condensation in which at least two condensates are obtained respectively consisting for the most part of the phosphorus and fluorine compounds contained in said gaseous reaction product, and separating molten calcium chloride from the unfused solid matter of the non-volatile residue of said heat treatment.

5. The method of recovering values from a natural phosphatic material containing recoverable amounts of phosphorus, fluorine and calcium which comprises preparing an intimate mixture consisting essentially of said material and from 15 to 30% by weight of a carbonaceous material, subjecting said mixture to heat-treatment for a period not exceeding 90 minutes at a temperature between about 2000° F. and about 2400° F. in an atmosphere of hydrogen chloride gas in which the amount by weight of chlorine present is at least the equivalent of from 50 to 150 parts per 100 parts of said mixture, subjecting the gaseous reaction product of the heat-treatment to selective condensation in which at least two condensates are obtained respectively consisting for the most part of the phosphorus and fluorine contents of said gaseous reaction product, and separating molten calcium chloride from the unfused solid matter of the non-volatile residue of said heat-treatment.

References Cited in the file of this patent

UNITED STATES PATENTS 2,531,046    Hollingsworth _____ Nov. 21, 1950

FOREIGN PATENTS 7,636    Great Britain _____ Feb. 16, 1895
of 1894